United States Patent
Amemiya (10) Patent No.: US 9,670,865 B2
(45) Date of Patent: Jun. 6, 2017

(54) DRIVING CONTROL DEVICE AND DRIVING CONTROL METHOD IN HYBRID ELECTRIC VEHICLE

(71) Applicant: NISSAN MOTOR CO., LTD., Yokohama-shi, Kanagawa (JP)

(72) Inventor: Jun Amemiya, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 299 days.

(21) Appl. No.: 14/384,908

(22) PCT Filed: Mar. 12, 2013

(86) PCT No.: PCT/JP2013/056873
§ 371 (c)(1),
(2) Date: Sep. 12, 2014

(87) PCT Pub. No.: WO2013/137279
PCT Pub. Date: Sep. 19, 2013

(65) Prior Publication Data
US 2015/0032358 A1   Jan. 29, 2015

(30) Foreign Application Priority Data
Mar. 16, 2012 (JP) ................................ 2012-059685

(51) Int. Cl.
*B60W 10/00* (2006.01)
*F02D 41/30* (2006.01)
(Continued)

(52) U.S. Cl.
CPC ............ *F02D 41/3076* (2013.01); *B60K 6/48* (2013.01); *B60W 10/02* (2013.01); *B60W 10/06* (2013.01);
(Continued)

(58) Field of Classification Search
CPC . B60K 3/00; B60K 6/485; B60K 6/48; B60K 6/36; F02D 41/3076
See application file for complete search history.

(56) References Cited

U.S. PATENT DOCUMENTS 6,223,846 B1 * 5/2001 Schechter ................ B60K 3/00
123/90.12
6,299,563 B1 * 10/2001 Shimasaki ............... B60K 6/36
477/3

(Continued)

FOREIGN PATENT DOCUMENTS

JP           08-121203 A       5/1996

*Primary Examiner* — Hau Phan
(74) *Attorney, Agent, or Firm* — Foley & Lardner LLP (57) ABSTRACT

In a hybrid electric vehicle in which an internal combustion engine and an electric motor/generator are connected via a clutch, the controller performs the following processing before the operation of the internal combustion engine stops in a stationary state of the vehicle while the clutch is engaged. Specifically, it is determined whether or not the clutch can be disengaged within a predetermined time period. If the clutch can be disengaged within a predetermined time period, the clutch is disengaged. If the clutch cannot be disengaged within the predetermined time period, a driving torque of the internal combustion engine is lowered to an engine stoppable torque set in advance while the clutch is engaged. Then, the operation of the internal combustion engine stops. Through this control, it is possible to prevent a vibration sound or an abnormal sound that may be generated when a driver turns off the ignition button.

9 Claims, 7 Drawing Sheets

(51) Int. Cl.

| | | |
|---|---|---|
| *B60K 6/48* | (2007.10) | |
| *B60W 10/02* | (2006.01) | |
| *B60W 10/06* | (2006.01) | |
| *B60W 20/00* | (2016.01) | |
| *F02D 29/02* | (2006.01) | |
| *F02D 41/02* | (2006.01) | |
| *F02D 41/04* | (2006.01) | |
| *B60W 30/18* | (2012.01) | |
| *F02D 25/02* | (2006.01) | |
| *F02D 41/00* | (2006.01) | |

(52) U.S. Cl.
CPC ...... *B60W 20/00* (2013.01); *B60W 30/18054* (2013.01); *F02D 25/02* (2013.01); *F02D 29/02* (2013.01); *F02D 41/022* (2013.01); *F02D 41/042* (2013.01); *B60K 2006/4825* (2013.01); *B60W 2510/0291* (2013.01); *B60W 2710/0666* (2013.01); *B60W 2710/083* (2013.01); *F02D 2041/001* (2013.01); *F16D 2500/1066* (2013.01); *F16D 2500/3063* (2013.01); *F16D 2500/30401* (2013.01); *F16D 2500/50287* (2013.01); *Y02T 10/6221* (2013.01); *Y02T 10/6252* (2013.01)

(56) References Cited

U.S. PATENT DOCUMENTS

| | | | |
|---|---|---|---|
| 6,340,016 B1* | 1/2002 | Ueda | F02D 41/0025 |
| | | | 123/305 |
| 2001/0028233 A1* | 10/2001 | Omata | B60K 6/485 |
| | | | 318/445 |
| 2002/0014872 A1* | 2/2002 | Morimoto | B60K 6/485 |
| | | | 318/445 |
| 2003/0039123 A1* | 2/2003 | Crisick | B60Q 1/444 |
| | | | 362/464 |
| 2006/0199696 A1* | 9/2006 | Gouda | B60K 6/48 |
| | | | 477/3 |
| 2012/0234004 A1* | 9/2012 | Stoffels | F02D 23/00 |
| | | | 60/605.1 |
| 2013/0226378 A1* | 8/2013 | Tate, Jr. | F02N 11/0837 |
| | | | 701/22 |

* cited by examiner

DRIVING CONTROL DEVICE AND DRIVING CONTROL METHOD IN HYBRID ELECTRIC VEHICLE

TECHNICAL FIELD

This invention relates to a control performed when a hybrid electric vehicle driven using power from an internal combustion engine and an electric motor stops operation.

BACKGROUND ART

In a hybrid electric vehicle having an internal combustion engine and an electric motor, an electric vehicle (EV) mode operation in which only an electric motor is used as a motive power and a hybrid electric vehicle (HEV) mode operation in which both the internal combustion engine and the electric motor are used as the motive power are selectively applied. For this purpose, the internal combustion engine and the electric motor are connected by a clutch.

In such a hybrid electric vehicle, the internal combustion engine may be still operated for charging a battery or other reasons even when a selector lever is set to a parking range in a vehicle stationary state. If a driver turns off an ignition button of the vehicle when the internal combustion engine is operated in the vehicle stationary state in this manner, a fuel supply to the internal combustion engine stops while the clutch is engaged.

With respect to the case described above, JP H08-121203A, published in 1996 by the Japan Patent Office, proposes a hybrid electric vehicle in which the clutch is disengaged and thereafter fuel supply to the internal combustion engine stops.

SUMMARY OF INVENTION

In this case, if the ignition button is turned off, the hybrid drive system itself stops. When the clutch is a normally engaged clutch that is engaged by releasing a hydraulic pressure, the hydraulic pressure of the clutch is released as the hybrid drive system stops, so that the clutch is re-engaged. If the clutch is re-engaged while the engine rotation speed is decreasing by stopping the fuel supply, the decreasing engine rotation speed passes through a resonance frequency band of a power train. As a result, a vibration sound or an abnormal sound may be generated by resonance of the power train.

It is therefore an object of this disclosure to prevent a vibration sound or an abnormal sound from being generated in a hybrid electric vehicle when the ignition button is turned off while the internal combustion engine is operated in the vehicle stationary state.

In order to achieve the above object, this invention provides a driving control device applied to such a hybrid electric vehicle that comprises an internal combustion engine, an electric motor/generator, and a clutch connecting the internal combustion engine and the electric motor/generator.

The driving control device comprises a sensor that detects whether or not the vehicle stationary, a sensor that detects whether or not the clutch is engaged, a sensor that detects whether or not the internal combustion engine is in operation, a sensor that detects whether or not a request for stopping operation of the internal combustion engine has been input, and a programmable controller.

The controller is programmed to determine, when the request for stopping operation of the combustion engine has been input in a state where the internal combustion engine is in operation and the clutch is engaged in a vehicle stationary state, whether or not the clutch can be disengaged within a predetermined time period. If the clutch can be disengaged within the predetermined time period, the controller is programmed to disengage the clutch and control an operation stop of the internal combustion engine by cutting off a fuel to cause a rotation speed of the internal combustion engine to decrease below a predetermined resonance frequency band while the clutch is disengaged. If the clutch cannot be disengaged within the predetermined time period, the controller is programmed to decrease an output torque of the internal combustion engine to a predetermined torque in a state where the clutch is engaged and thereafter stop the operation of the internal combustion engine.

The details as well as other features and advantages of this invention are set forth in the remainder of the specification and are shown in the accompanying drawings.

DESCRIPTION OF EMBODIMENTS

Figure 1:
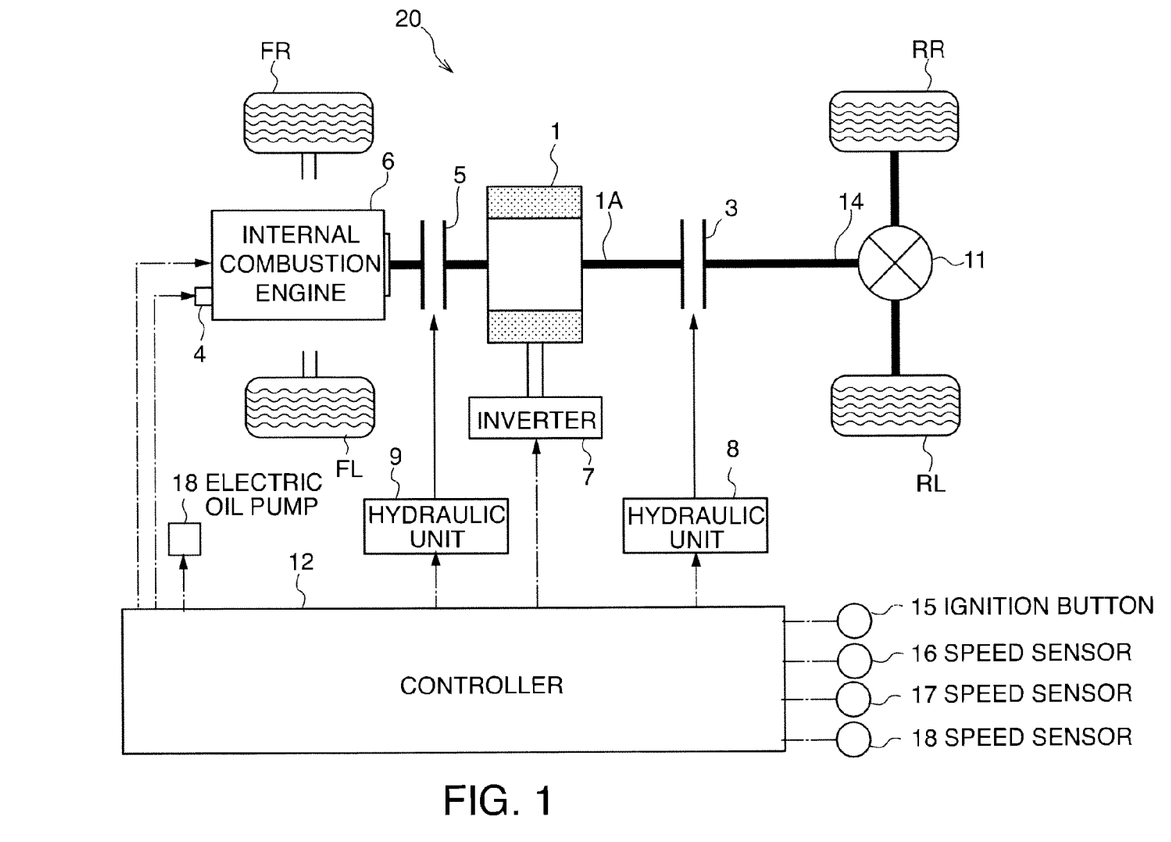
FIG. 1 is a schematic block diagram illustrating a hybrid electric vehicle according to this disclosure.

Referring to FIG. 1 of the drawings, a driving control device according to an embodiment of this invention is applied to a rear wheel drive hybrid electric vehicle 20. The hybrid electric vehicle 20 travels using four wheels including a front right wheel FR, a front left wheel FL, a rear right wheel RR, and a rear left wheel RL. In this configuration, each of the rear right wheel RR and the rear left wheel RL serves as a drive wheel.

The rear right wheel RR and the rear left RL serving as the drive wheels are combined into a propeller shaft 14 via a differential 11. The propeller shaft 14 is connected to an electric motor/generator 1 via a second clutch 2. The electric motor/generator 1 is connected to an internal combustion engine 6 via a first clutch 5.

The first clutch 5 is operated between an engagement position and a disengagement position depending on a hydraulic pressure supplied from the hydraulic pressure supply unit 9. In the engagement position, a torque is bi-directionally transmitted between the electric motor/generator 1 and the internal combustion engine 6 so that they rotate in a synchronous manner. In the disengagement position, the electric motor/generator 1 and the internal combustion engine 6 relatively rotate in an independent manner.

The internal combustion engine 6 is provided with a variable valve timing mechanism (VTC) 4 that changes a valve timing depending on an operation state. The VTC 4 is a mechanism for changing a valve timing of the internal combustion engine 6 by rotating a vane incorporated in the VTC 4 depending on the supplied hydraulic pressure. When the internal combustion engine 6 stops, the vane is locked in a predetermined position in order not to vibrate the vane. The internal combustion engine 6 changes the valve timing depending on a driving condition by providing one or both of intake and exhaust valves with the VTC 4 configured as described above.

The second clutch 2 is operated by the hydraulic pressure supplied from the hydraulic pressure supply unit 8. In the engagement state, an output shaft 1A of the electric motor/generator 1 and the propeller shaft 14 are combined with each other to rotate in a synchronous manner. In the disengagement state, the output shaft 1A and the propeller shaft 14 relatively rotate without a resistance. The second clutch 2 serves as a frictional engagement element of the automatic transmission interposed between the output shaft 1A and the propeller shaft 14.

Each of the first and second clutches 5 and 2 is constituted by a frictional clutch. The first clutch 5 is a so-called a normally engaged clutch, which is disengaged by the hydraulic pressure supplied from the hydraulic pressure supply unit 9 and is engaged by releasing the hydraulic pressure.

The hydraulic pressure is supplied to the first and second clutches 5 and 2 through the hydraulic pressure supply units 9 and 8, respectively, using a mechanical oil pump attached to the internal combustion engine 6 or an electric oil pump 18.

An automatic transmission fluid (ATF) is used as the hydraulic fluid supplied to the first and second clutches 5 and 2 from the mechanical oil pump or the electric oil pump 18 via the hydraulic pressure supply units 8 and 9.

An inverter 7 is connected to the electric motor/generator 1. The electric motor/generator 1 rotates as an electric motor by an electric power supplied from a battery, not shown, via the inverter 7. The electric motor/generator 1 charges the battery by generating electric power by a torque of the internal combustion engine 6 input via the first clutch 5 in the engaged state.

The driving operation and the electric generation operation of the electric motor/generator 1 are controlled in response to an input signal from a controller 12 to the inverter 7. The electric oil pump 18 is driven in response to a driving signal from the controller 12. The second clutch 2 is engaged or disengaged in response to an input signal from the controller 12 to the hydraulic pressure supply unit 8. The first clutch 5 is engaged or disengaged in response to an input signal from the controller 12 to the hydraulic pressure supply unit 9. The operation of the internal combustion engine 6 is also controlled by the controller 12, including an operation of the VTC 4.

The controller 12 that performs the control described above is constituted by a microcomputer comprising a central processing unit (CPU), a read-only memory (ROM), a random access memory (RAM), and an input/output (I/O) interface. According to this embodiment, for convenient description purposes, it is assumed that a single controller 12 controls overall operations of the hydraulic pressure supply units 8 and 9, the internal combustion engine 6, the electric oil pump 18, and the electric motor/generator 1. Alternatively, a separate controller may also be employed to perform the control depending on a control target.

The controller 12 receives detection signals, through corresponding signal circuits, from an ignition button 15 used by a driver to input an operation stop request for stopping the operation of the internal combustion engine 6, a speed sensor 16 that detects a rotation speed of the internal combustion engine 6, a speed sensor 17 that detects a rotation speed of the electric motor/generator 1, and a temperature sensor 19 that detects a temperature of the hydraulic fluid supplied to the first clutch 5.

In the configuration described above, the hybrid electric vehicle 20 performs an EV mode operation in which only the power from the electric motor/generator 1 is used and a HEV mode operation in which both the power from the electric motor/generator 1 and the power from the internal combustion engine 6 are used.

It should be noted that the internal combustion engine 6 may be operated in a state where the first clutch 5 is engaged while the hybrid electric vehicle 20 is stationary. For example, such a case may occur when the hybrid electric vehicle 20 stops after it travels by virtue of the power of the internal combustion engine 6. In addition, such a case may occur when a charge amount of the battery is low, and the internal combustion engine 6 drives the electric motor/generator 1 as a generator in a vehicle stationary state in order to charge the battery.

In such cases, if a driver turns off the ignition button 15, the fuel supply to the internal combustion engine 6 stops, and the rotation speed of the internal combustion engine 6 decreases due to a fuel cutoff. In this case, if the first clutch 5 is engaged, a vibration sound or an abnormal sound may occur from a power train when the engine rotation speed lowers through a resonance frequency band of the power train. For this reason, it is desirable to disengage the first clutch 5 before the engine rotation speed decreases to the resonance frequency band of the power train and stop the operation of the internal combustion engine 6 after the first clutch 5 is disengaged.

The hydraulic pressure supply unit 9 that supplies the hydraulic pressure for disengaging the first clutch 5 is supplied with a hydraulic pressure from the mechanical oil pump attached to the internal combustion engine 6 or the electric oil pump 18. However, the mechanical oil pump is not usable to stop the operation of the internal combustion engine 6 because it lowers the supplied pressure as the rotation speed of the internal combustion engine 6 decreases. Unlike the mechanical oil pump, the electric oil pump 18 operates independently from the operation of the internal combustion engine 6. However, as the ignition button 15 is turned off, the hybrid drive system stops, and the operation of the electric oil pump 18 also stops. If the hydraulic pressure supplied from the electric oil pump 18 to the hydraulic pressure supply unit 9 stops before the engine rotation speed passes through the resonance frequency band of the power train, the hydraulic pressure of the first clutch 5 is released. As a result, the normally engaged first clutch 5 engages.

In order to prevent a noise or an abnormal sound from occurring in such a case, the controller 12 performs the following determination when the operation of the internal combustion engine 6 stops while the first clutch 5 is engaged in the vehicle stationary state. Specifically, it is determined whether or not the first clutch 5 can be disengaged before the rotation speed of the internal combustion engine 6 decreases to the resonance frequency band.

Only when the determination is affirmative, the first clutch 5 is disengaged and the operation of the internal combustion engine 6 is stopped after the first clutch is disengaged. In contrast, if the determination is negative, the operation of the internal combustion engine 6 is stopped by operating the electric motor/generator 1 as a generator while the first clutch 5 is engaged.

Figure 2:
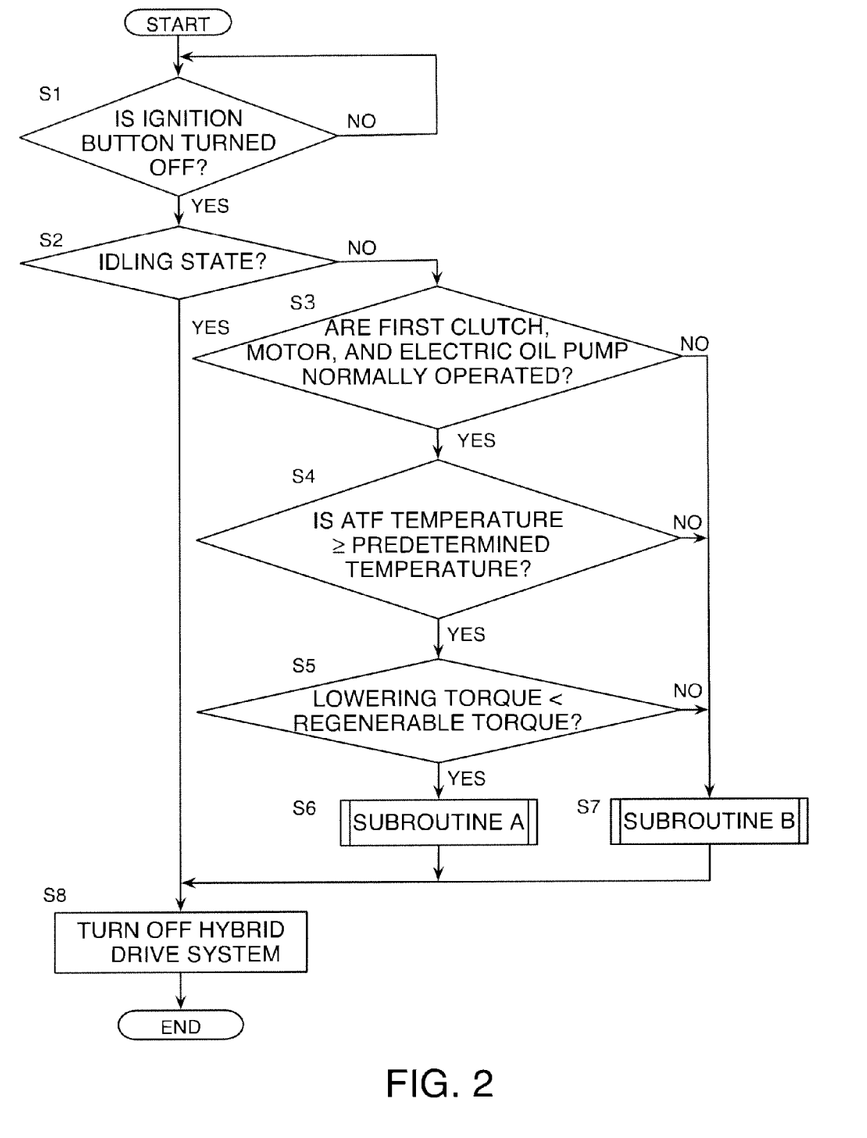
FIG. 2 is a flowchart illustrating an internal combustion engine operation stop routine of the hybrid electric vehicle executed by a controller according to an embodiment of this disclosure.

Referring to FIG. 2, an internal combustion engine operation stop routine of the hybrid electric vehicle 20 executed by the controller 12 for the aforementioned control will be described.

First, an overview of this routine will be described. When a driver turns off the ignition button during the stationary state of the hybrid electric vehicle 20, the controller 12 performs the following determination. Specifically, it is determined whether or not the first clutch 5 can be disengaged before the rotation speed of the internal combustion engine 6 decreases to the resonance frequency band. If the determination is affirmative, the controller 12 executes a subroutine A. If the determination is negative, the controller 12 executes a subroutine B.

In the subroutine A, by controlling the rotation speed of the electric motor/generator 1, the engine rotation speed of the internal combustion engine 6 decreases, and the first clutch 5 is disengaged before the engine rotation speed decreases to the resonance frequency band. In the subroutine B, an operation for disengaging the first clutch 5 is not performed. Instead, the electric motor/generator 1 is caused to generate power using the output torque of the internal combustion engine 6, thereby decreasing the engine rotation speed of the internal combustion engine 6 within a short period of time.

The routine of FIG. 2 is executed when the internal combustion engine 6 is operated while the hybrid electric vehicle 20 is stationary.

In a step S1, the controller 12 determines whether or not the ignition button 15 is turned off. If the ignition button 15 is not turned off, the process waits until the ignition button 15 is turned off.

As the ignition button 15 is turned off, the controller 12 determines whether or not the internal combustion engine 6 is in an idle operation in a step S2. Specifically, it is determined whether or not the current rotation speed of the internal combustion engine 6 corresponds to an idle rotation speed. During the idle operation, the engine rotation speed of the internal combustion engine 6 is typically lower than the resonance frequency band of the power train. Accordingly, there is no problem to perform an ignition-off operation, or in other words, a turn-off operation of the hybrid drive system. If the internal combustion engine 6 is in the idle operation, therefore, the controller 12 turns off the hybrid drive system in a step S8, and the routine is terminated.

Turning off the hybrid drive system means that operations of overall devices of the hybrid electric vehicle 20, such as the internal combustion engine 6, the electric motor/generator 1, and the electric oil pump 18, are terminated. Therefore, the operation of the internal combustion engine 6 also stops as the hybrid drive system is turned off.

If the internal combustion engine 6 is not in the idle operation in the step S2, it means that the internal combustion engine 6 operates at a higher speed than the idle operation speed. In this case, the controller 12 performs processings of a step S3 and subsequent steps.

First, in the step S3, the controller 12 determines whether or not there is a failure in the first clutch 5, the electric motor/generator 1, and the electric oil pump 18. If there is a failure in the first clutch 5 or the electric oil pump 18, the operation of the first clutch 5 is affected. A case where there is a failure in the electric motor/generator 1 will be described below. In any case, the controller 12 executes the subroutine B in a step S7 and then turns off the hybrid drive system in the step S8. After the processing of the step S8, the routine is terminated.

If it is determined in the step S3 that there is no failure in any one of the first clutch 5, the electric motor/generator 1, and the electric oil pump 18, the controller 12 determines whether or not the temperature of the ATF described above is equal to or higher than a predetermined temperature in a step S4. If the temperature of the ATF is low, a response to the operation of the first clutch 5 is delayed, so that it is difficult to disengage the first clutch 5 at a desired timing. Even in this case, the controller 12 executes the subroutine B in the step S7 and then turns off the hybrid drive system in the step S8. After the processing of the step S8, the routine is terminated.

If it is determined that the temperature of the ATF is equal to or higher than the predetermined temperature in the step S4, the controller 12 determines whether or not a lowering torque is lower than a regenerable torque in a step S5. Herein, the "lowering torque" refers to a motor torque necessary to lower the rotation speed of the internal combustion engine 6 to be equal to or lower than the resonance frequency band within a predetermined time period. The lowering torque is computed based on inertia of the internal combustion engine 6 and the electric motor/generator 1 and a target motor rotation angular velocity to which the rotation speed is lowered.

Meanwhile, the "regenerable torque" refers to a negative torque that can be applied to the internal combustion engine 6 from the electric motor/generator 1. The electric motor/generator 1 can generate power using the output torque of the internal combustion engine 6. In this state, the electric motor/generator 1 applies a negative torque to the internal combustion engine 6. A maximum of this value is set to the regenerable torque.

If the lowering torque is equal to or higher than the regenerable torque, the electric motor/generator 1 cannot lower the rotation speed of the internal combustion engine 6 to be equal to or lower than the resonance frequency band within the predetermined time period even if the electric motor/generator 1 is operated as a generator to decrease the rotation speed of the internal combustion engine 6. In this case, the controller 12 executes the subroutine B in the step S7 and then turns off the hybrid drive system in the step S8. After the processing of the step S8, the routine is terminated.

The failure determination of the first clutch 5 and the electric oil pump 18 performed in the step S3 and the ATF temperature determination performed in the step S4 corresponds to the determination on whether or not the first clutch 5 can be disengaged before the rotation speed of the internal combustion engine 6 decreases to the resonance frequency band. In order to satisfy this condition, it is necessary to complete the disengagement of the first clutch 5, for example, within one second after the ignition button 15 is pressed. If any of the failure determination of the first clutch 5 and the electric oil pump 18 in the step S3 and the ATF temperature determination in the step S4 is negative, it is determined that it is difficult to complete the disengagement of the first clutch 5 within one second after the ignition button 15 is pressed.

Figure 3:
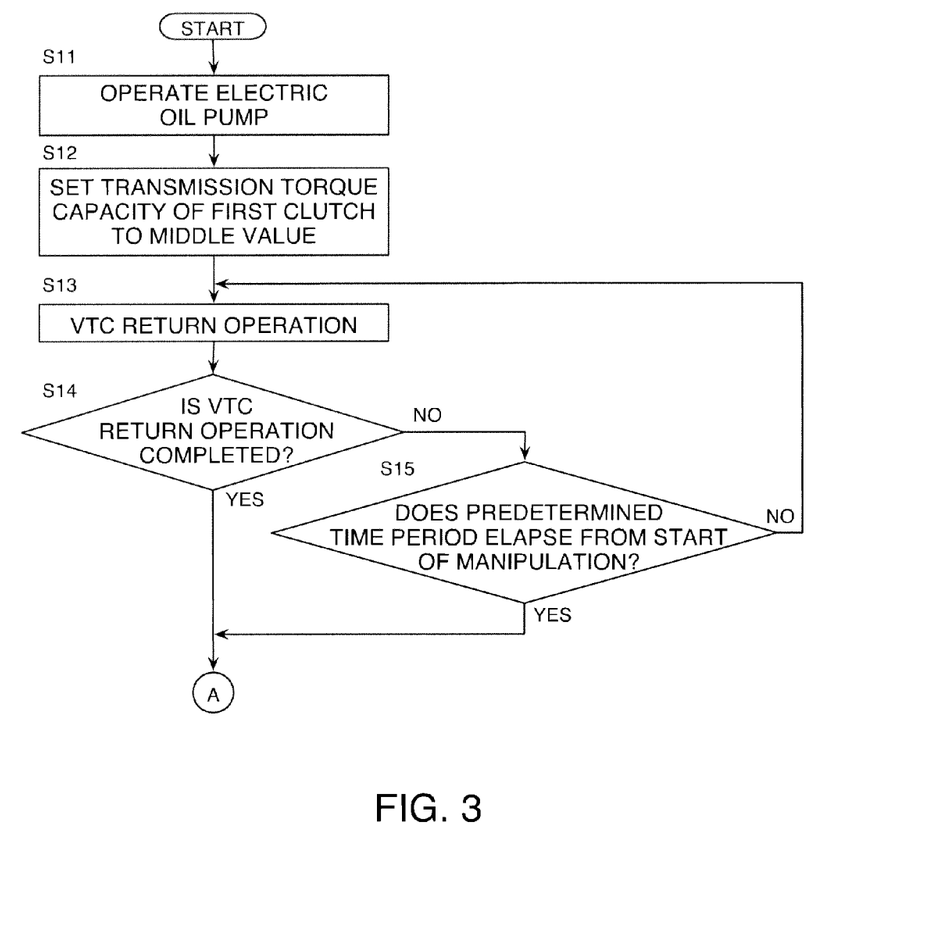
FIG. 3 is a flowchart illustrating a part of a subroutine A executed by the controller in the internal combustion engine operation stop routine.
Figure 4:
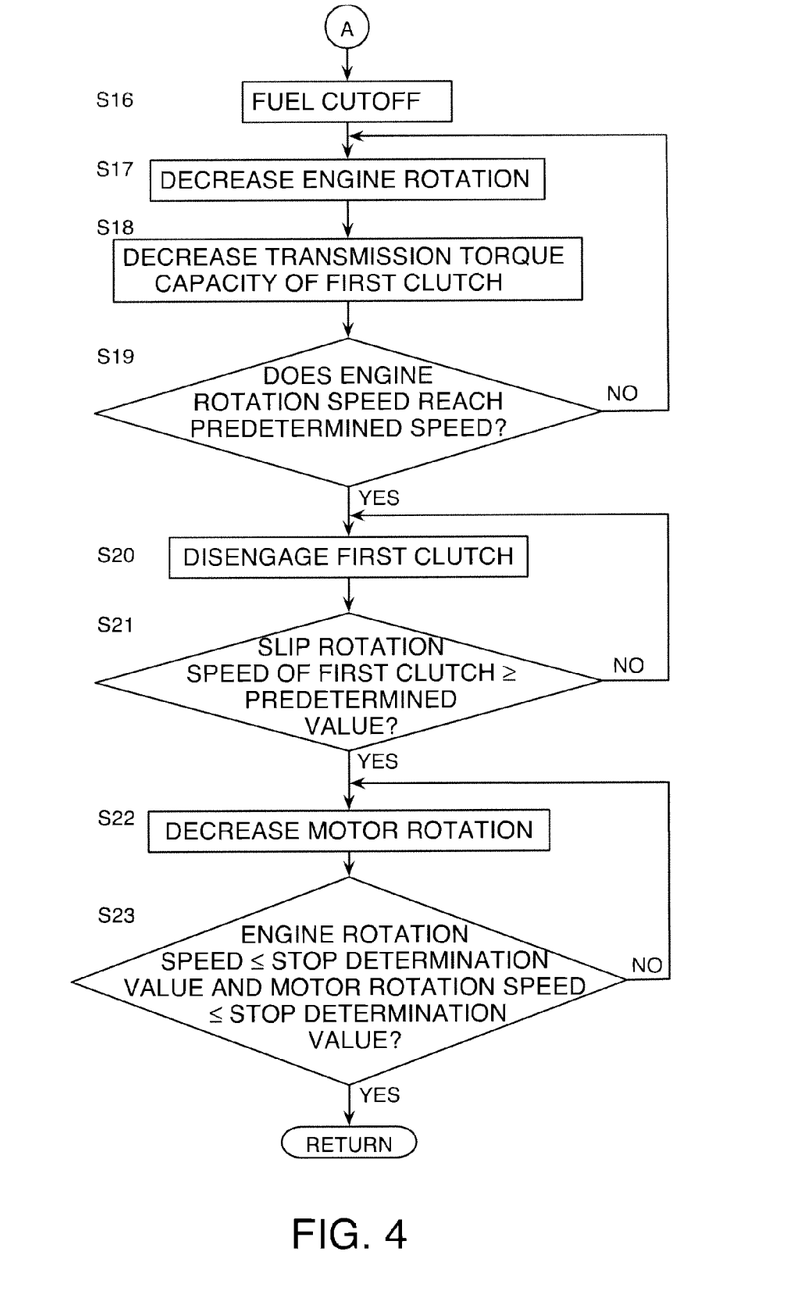
FIG. 4 is a flowchart illustrating a remaining part of the subroutine A.

Referring to FIGS. 3 and 4 next, the subroutine A will be described. The controller 12 executes the subroutine A if it is determined that the first clutch 5 can be disengaged before the rotation speed of the internal combustion engine 6 decreases to the resonance frequency band, that is, if all the determinations of the steps S3 to S5 are affirmative.

Referring to FIG. 3, the controller 12 operates the electric oil pump 18 in a step S11. In the hybrid electric vehicle 20, a hydraulic pressure required in the entire hybrid drive system including the hydraulic pressure supply units 8 and 9 or the VTC 4 is supplied from the mechanical oil pump attached to the internal combustion engine 6 when the internal combustion engine 6 is operated. In the EV mode operation in which the internal combustion engine 6 is stationary, a required hydraulic pressure is supplied by operating a separate electric oil pump 18. The electric oil pump that is operated in the step S3 corresponds to this electric oil pump 18.

In a step S12, the controller 12 controls the hydraulic pressure of the hydraulic pressure supply unit 9 such that a transmission torque capacity of the first clutch 5 has a middle value. Herein, the middle value is a value serving as a start point of the process of lowering the transmission torque capacity of the first clutch 5, at which both transmission and slippage of the torque between the electric motor/generator 1 and the internal combustion engine 6 are allowed. That is, until the transmission torque reaches the middle value, the electric motor/generator 1 and the internal combustion engine 6 rotate in a synchronous manner to transmit a torque. If the transmission torque exceeds the middle value, the electric motor/generator 1 and the internal combustion engine 6 rotate in a slipping manner to allow for a relative rotation there-between.

In a step S13, the controller 12 performs a return operation of the VTC 4. This means an operation of locking the vane of the VTC 4 in the predetermined position as described above.

In a step S14, the controller 12 determines whether or not the return operation of the VTC 4 is completed. If the return operation is completed, the controller 12 performs processings of a step S16 and subsequent steps of FIG. 4. If the return operation is not completed, the controller 12 determines in a step S15 whether or not a predetermined time period has elapsed after the return operation of the VTC 4 is initiated. If it is determined that the predetermined time period has elapsed, the processings of the step S16 and the subsequent steps of FIG. 4 are processed. If the predetermined time period has not elapsed, the controller 12 repeats the processing of the step S13 and the determinations of the steps S14 and S15 to wait until the return operation of the VTC 4 is completed or until the predetermined time period elapses after the manipulation is initiated.

The determination of the step S15 has the following meaning. For example, the return operation of the VTC 4 may not be completed within the predetermined time period if the VTC 4 has a failure, or a temperature of the hydraulic fluid is low. By providing the step S15, a timeout measure is provided in the return operation of the VTC 4. That is, if the time runs out, the subroutine A is terminated without waiting for completion of the return operation of the VTC 4, and the hybrid drive system is turned off in the step S8 of FIG. 2, and thereafter the routine is terminated. By performing the determination of the step S15, therefore, it is possible to prevent the operation stop process of the internal combustion engine 6 from being delayed.

Referring to FIG. 4 now, the controller 12 cuts off a fuel supply to the internal combustion engine 6 under the operation in the step S16.

In a step S17, the controller 12 decreases the rotation speed of the internal combustion engine 6 by a predetermined amount by decreasing the rotation speed of the electric motor/generator 1 via the inverter 7.

In a step S18, the controller 12 decreases the transmission torque capacity of the first clutch 5 by a predetermined amount from the middle value by controlling the hydraulic pressure supply unit 9.

In a step S19, the controller 12 determines whether or not the engine rotation speed has decreased to a predetermined speed. If the determination is negative in the step S19, the processings of the steps S17 and S18 and the determination of the step S19 are repeated. If the determination of the step S19 changes to be affirmative, that is, if the engine rotation speed has decreased to the predetermined speed, the controller 12 performs the processing of a step S20.

In the step S20, the controller 12 stops the supply of the hydraulic pressure from the hydraulic pressure supply unit 9 to the first clutch 5 to disengage the first clutch 5.

In a step S21, the controller 12 determines whether or not the slip rotation speed of the first clutch 5 becomes equal to or higher than a predetermined value based on input signals from the speed sensors 16 and 17. Herein, the "slip rotation speed" refers to a difference between the rotation speed of the internal combustion engine 6 and the rotation speed of the electric motor/generator 1. If the determination in the step S21 is affirmative, the processing of a step S22 is performed. If the determination in the step S21 is negative, the processing of the step S20 and the determination of the step S21 are repeated. This process has the following meaning. The first clutch 5 is not disengaged immediately when the supply of the hydraulic pressure to the first clutch 5 stops. By repeating the processing of the step S20 and the determination of step S21, it is possible to confirm whether or not the first clutch 5 is substantially disengaged.

In the step S22, the controller 12 further decreases the rotation speed of the electric motor/generator 1.

In a step S23, the controller 12 determines whether or not each of the rotation speed of the internal combustion engine 6 and the rotation speed of the electric motor/generator 1 has decreased to a stop determination value or lower. If the determination in the step S23 is negative, the controller 12 repeats the processing of the step S22 and the determination of the step S23. Since the first clutch 5 has been disengaged already, the internal combustion engine 6 in this step decreases the rotation speed due to a frictional resistance.

When the determination of the step S23 changes to be affirmative, the controller 12 terminates the subroutine A.

Returning again to FIG. 2, after the subroutine A is executed in the step S6, the controller 12 turns off the hybrid drive system in the step S8 and thereafter the routine is terminated.

Figure 5:
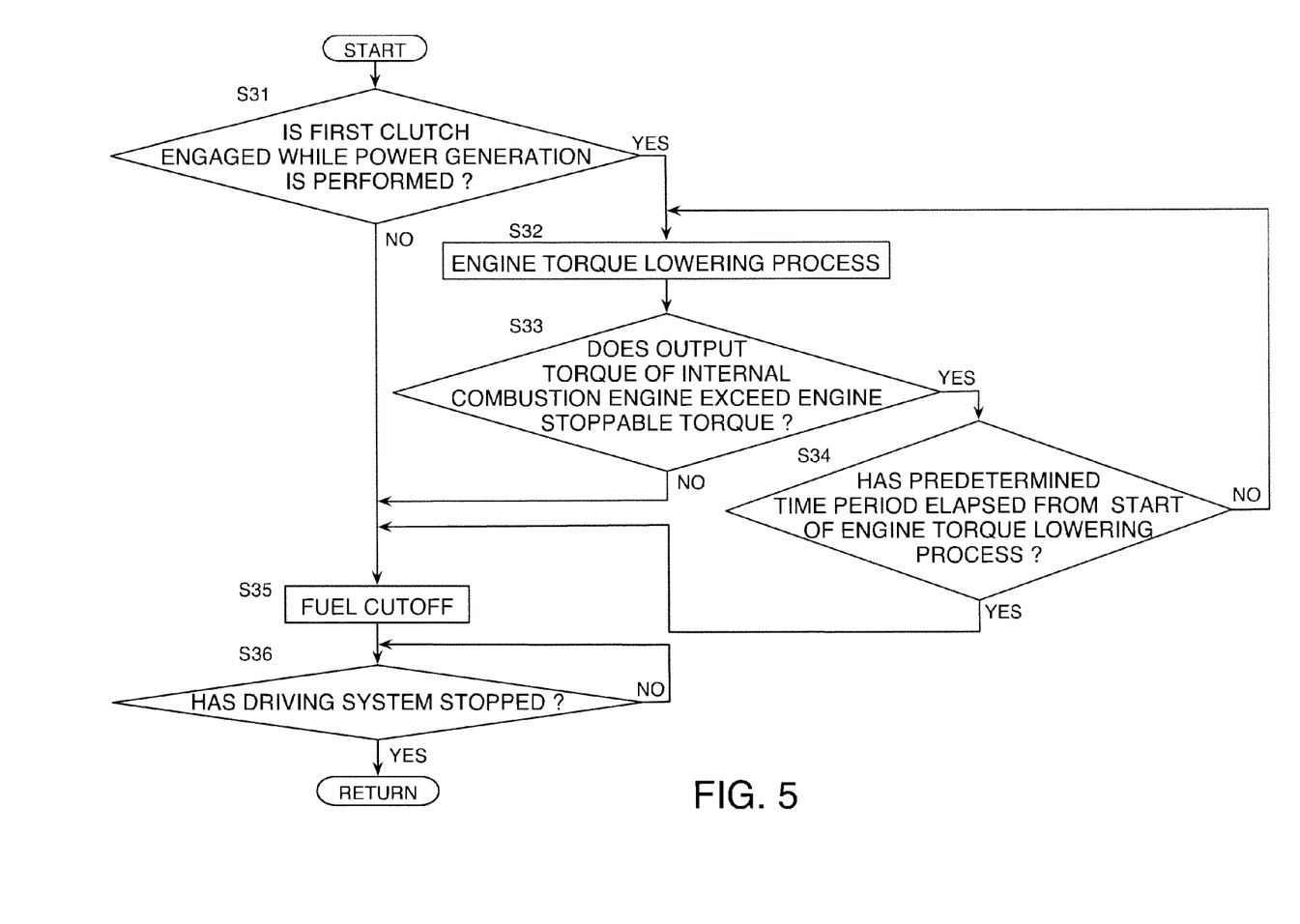
FIG. 5 is a flowchart illustrating a subroutine B executed by the controller in the internal combustion engine operation stop routine.

Referring to FIG. 5 next, the subroutine B will be described.

In a step S31, the controller 12 determines whether or not the first clutch 5 is engaged, and the electric motor/generator 1 generates power. If the determination in the step S31 is negative, that is, if the first clutch 5 is disengaged, or the electric motor/generator 1 does not generate power, the controller 12 performs processings of a step S35 and a subsequent step. That is, the controller 12 stops the fuel supply to the internal combustion engine 6 in the step S35, and determines whether or not the rotation of the internal combustion engine 6 and the rotation of the electric motor/generator 1 have stopped in a step S36 so as to terminate the subroutine B. The determination of the step S36 is performed similarly to the determination of the step S23.

If it is determined in the step S3 of FIG. 2 that there is a failure in the electric motor/generator 1, the determination in the step S31 also becomes negative. Therefore, the subroutine is terminated through the steps S35 and S36. That is, if there is a failure in the electric motor/generator 1, the operation of the internal combustion engine 6 stops by substantially immediately cutting off the fuel.

Otherwise, if it is determined that the first clutch 5 is engaged, and the electric motor/generator 1 generates power in the step S31, the controller 12 decreases the engine torque by a predetermined amount by controlling the internal combustion engine 6, specifically, by reducing a fuel injection amount and an intake air amount of the internal combustion engine 6 in a step S32.

Then, in a step S33, the controller 12 determines whether or not the output torque of the internal combustion engine 6 exceeds an engine stoppable torque at which the hybrid drive system can be turned off. The "engine stoppable torque" is an output torque of the internal combustion engine 6 determined as described below.

The electric motor/generator 1 has a faster response to the stop operation than that of the internal combustion engine 6. For this reason, if the operations of the internal combustion engine 6 and the electric motor/generator 1 stop while electric power is generated by driving the electric motor/generator 1 using the internal combustion engine 6, a load of the internal combustion engine 6 for the electric power generation is eliminated. As a result, an abrupt increase in the rotation speed of the internal combustion engine 6 may occur.

When the increased rotation speed of the internal combustion engine 6 decreases afterwards, it may pass through the resonance frequency band and generate an abnormal sound caused by vibration. For this reason, when the operation of the internal combustion engine 6 stops, it is desirable to decrease, in advance, the output torque of the internal combustion engine 6 to a level at which such a problem does not occur. This is referred to as an "engine stoppable torque."

The engine stoppable torque is set, for example, based on coefficients of dynamic friction or simply a friction of the internal combustion engine 6 and the electric motor/generator 1. If the friction is weak, a decrease rate of the rotation speed of the internal combustion engine 6 is also small. In this regard, as the friction decreases, the engine stoppable torque for preventing the abrupt increase in the rotation speed also decreases.

The friction is computed based on a mass of a rotating part of the internal combustion engine 6 or the electric motor/generator 1 or a frictional coefficient of a bearing or the like. In addition to the friction, inertia generated when the internal combustion engine 6 and the electric motor/generator 1 are operated may be computed, and the engine stoppable torque may be computed based on the friction and the inertia.

If the fuel is cut off while the driving torque of the internal combustion engine 6 is high, a compression reaction force caused by a cylinder internal pressure increases. This may generate a vibration sound when the rotation speed of the internal combustion engine 6 passes through the resonance frequency band. For this reason, it is desirable to decrease the output torque of the internal combustion engine 6 to a level at which the compression reaction force caused by the cylinder internal pressure does not generate a vibration sound.

However, this does not mean that a weaker cylinder pressure is preferable. In order to prevent knocking or the like, an allowable minimum fuel supply amount is set in the internal combustion engine 6. It is desirable to set the engine stoppable torque to an output torque corresponding to a fuel supply amount slightly greater than the minimum fuel supply amount.

The engine stoppable torque may be set based on the power generation torque of the electric motor/generator 1 during the power generation. The output torque of the internal combustion engine 6 easily changes depending on the engine rotation speed, the fuel supply amount, an oxygen amount in an exhaust gas, and the like. In this regard, the power generation torque of the electric motor/generator 1 can be directly computed from the power generation amount and thus can be computed with high accuracy. It is noted that, when the first clutch 5 is engaged, the output torque of the internal combustion engine 6 is substantially equal to the power generation torque of the electric motor/generator 1.

In this embodiment, the engine stoppable torque is set based on the power generation torque of the electric motor/generator 1.

Specifically, in consideration of an abrupt rotation speed increase of the internal combustion engine 6 when the power generation torque is reduced rapidly, the level of the power generation torque at which the abrupt rotation speed increase of the internal combustion engine 6 does not occur is computed. This level of the power generation torque is set as the engine stoppable torque. Furthermore, the engine stoppable torque set in this manner is preferably corrected by applying the output torque corresponding to the minimum fuel supply amount of the internal combustion engine 6 as a lower limitation.

However, if the determination in the step S33 is negative, that is, if the output torque of the internal combustion engine 6 has decreased to the engine stoppable torque, the controller 12 performs the processings of the step S35 and the subsequent step and then terminates the subroutine B.

If the determination in the step S33 is affirmative, that is, if the output torque of the internal combustion engine 6 exceeds the engine stoppable torque, the controller 12 determines whether or not the time elapsed from the start of the engine torque lowering process has reached a predetermined time period in a step S34.

If the predetermined time period has not elapsed, the controller 12 repeats the processing of the step S32 and the determination of the steps S33 and S34. If the predetermined time period has elapsed, the controller 12 performs the processing of the step S35 and the subsequent step and then terminates the subroutine B.

The determination of the step S34 has the following meaning. The engine torque lowering process may not be completed within the predetermined time period, for example, due to a failure in a throttle or a fuel injection system of the internal combustion engine 6. In the step S34, a timeout measure is provided in the engine torque lowering process. In the case of the timeout, the subroutine B is terminated without waiting for the completion of the engine torque lowering process, so that it is possible to avoid a delay of the operation stop process of the internal combustion engine 6. The predetermined time period is set to, for example, one second.

Returning to FIG. 2, after the subroutine A or B is terminated as described above, the controller 12 turns off the hybrid drive system in the step S8. As a result, the hybrid drive system stops.

Referring to FIGS. 6A to 6D, a result of the control obtained by executing the subroutine A in the controller 12 will be described.

Herein, it is assumed that the driver turns off the ignition button 15 at a timing t1 while the hybrid electric vehicle 20 is in a stationary state, the first clutch 5 is engaged, the internal combustion engine 6 is operated, and the electric motor/generator 1 and the internal combustion engine 6 rotate in a synchronous manner. For example, such a state include a case where a battery charge amount is low, and the internal combustion engine 6 drives the electric motor/generator 1 in the vehicle stationary state to generate power. In this case, the internal combustion engine 6 is operated under a predetermined engine load, so that the determination of the step S2 becomes negative.

Figure 6A:
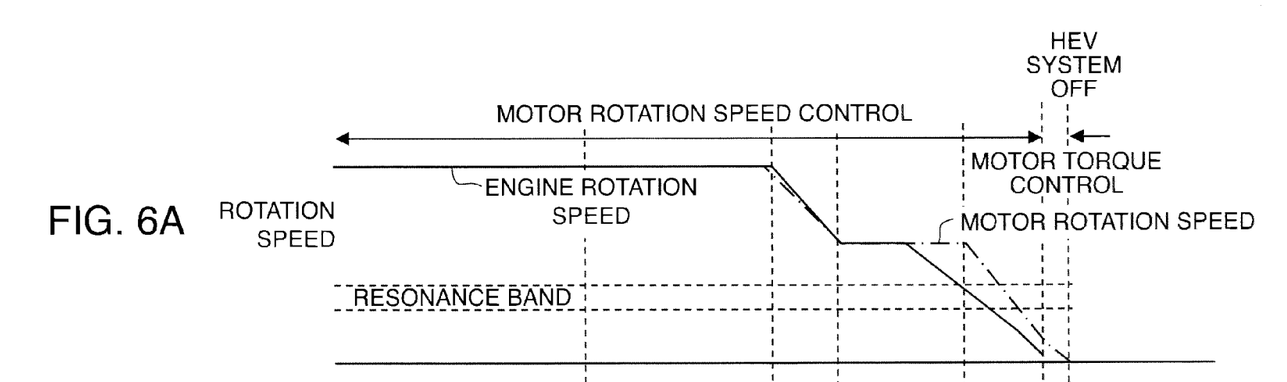
FIGS. 6A to 6D are timing charts illustrating a result of execution of the subroutine A.
Figures 6B, 6C:
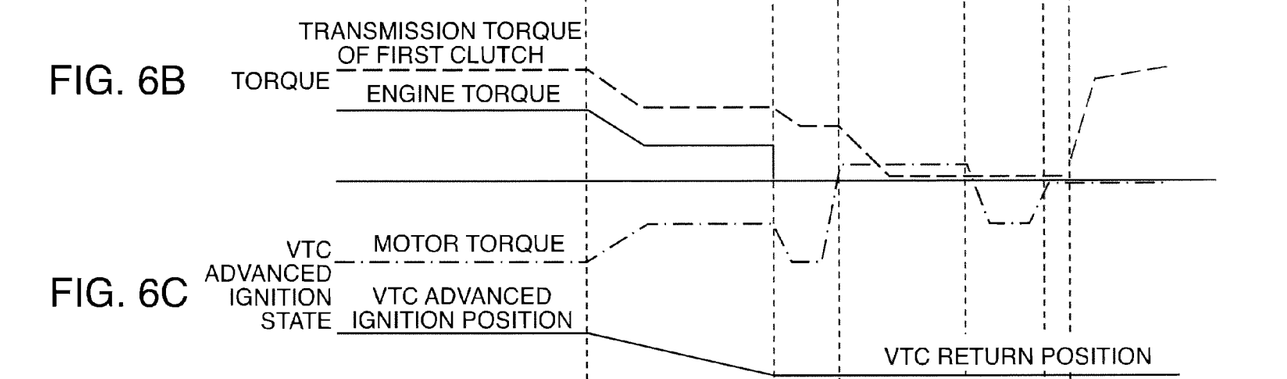
Figure 6D:
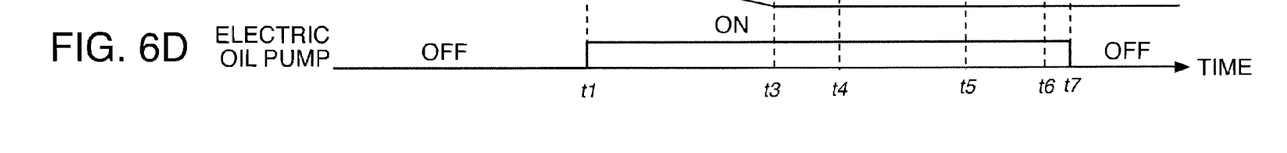

When the determinations in all the steps S3 to S5 are affirmative, that is, if it is determined that the first clutch 5 can be disengaged before the rotation speed of the internal combustion engine 6 decreases to the resonance frequency band, the controller 12 executes the subroutine A of FIGS. 3 and 4. First, as a result of execution of the step S11, the electric oil pump 18 is activated at the timing t1 as illustrated in FIG. 6D.

Then, the controller 12 maintains the rotation speeds of the internal combustion engine 6 and the electric motor/generator 1 until the completion of the return operation of the VTC 4 or the timeout, and performs the fuel cutoff of the internal combustion engine 6 at a timing t3 in the step S16. In addition, in the step S17, the controller 12 decreases the rotation speed of the electric motor/generator 1 via the inverter 7 so that the rotation speed of the internal combustion engine 6 decreases by the predetermined amount. Correspondingly, in the step S18, the transmission torque capacity of the first clutch 5 decreases by the predetermined amount from the middle value by controlling the hydraulic pressure supply unit 9.

As the engine rotation speed decreases to the predetermined speed by repeating the aforementioned process at a timing t4, the determination of the step S19 changes to be affirmative. At this time, the controller 12 disengages the first clutch 5 in the step S20.

As the first clutch 5 is disengaged, a difference of the rotation speeds between the internal combustion engine 6 and the electric motor/generator 1, that is, a slip rotation speed of the first clutch 5 increases due to a difference of the inertial forces between the internal combustion engine 6 and the electric motor/generator 1 that function to keep rotation. The rotation speed of the internal combustion engine 6 decreases due to a frictional resistance across the resonance frequency band in the vicinity of a timing t5 as illustrated in FIG. 6A. However, since the first clutch 5 is disengaged at this timing, the resonance of the power train does not generate a noise or abnormal sound. In addition, since the return operation of the VTC 4 has been completed, a noise or abnormal sound is not generated.

Meanwhile, as the slip rotation speed becomes equal to or higher than the predetermined amount in the step S21 at the timing t5, the controller 12 decreases the rotation speed of the electric motor/generator 1 by controlling the inverter 7 in the step S22. As a result, at a timing t7, both the engine rotation speed and the motor rotation speed become equal to or lower than the stop determination value, and the controller 12 turns off the hybrid drive system in the step S8 of the routine of FIG. 2, and thereafter the routine is terminated.

Figure 7A:
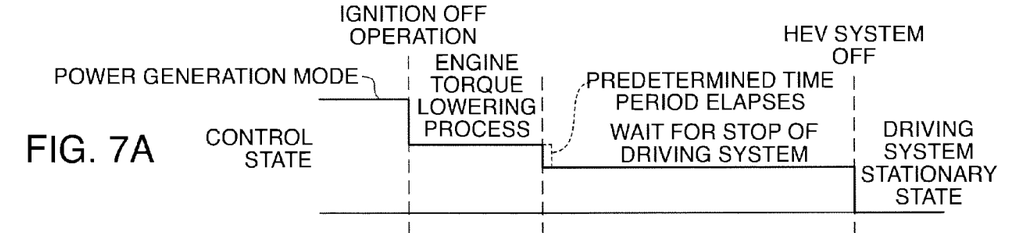
FIGS. 7A to 7F are timing charts illustrating a result of execution of the subroutine B.
Figures 7B, 7C:
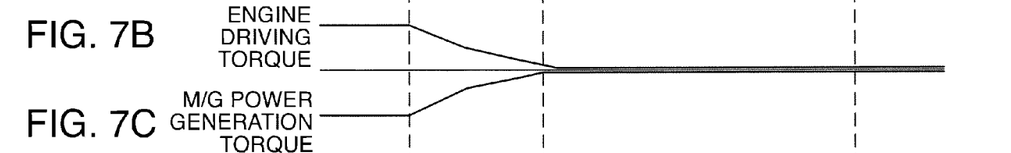
Figure 7D:
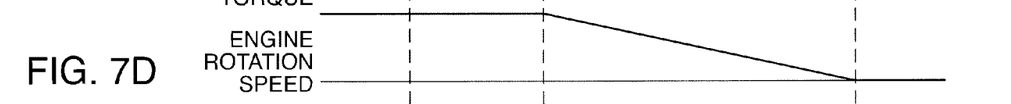
Figure 7E:
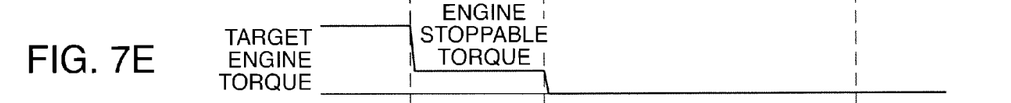
Figure 7F:
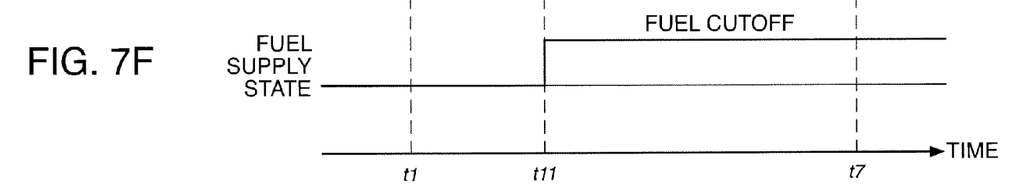

Referring to FIGS. 7A and 7F, a result of the control performed when the controller 12 executes the subroutine B will be described.

The subroutine B is executed when any of the determinations of the steps S3 to S5 is negative in the routine of FIG. 2. This corresponds to a case where a possibility of disengaging the first clutch 5 before the rotation speed of the internal combustion engine 6 decreases to the resonance frequency band is low.

In this case, the controller 12 determines whether or not the first clutch 5 is engaged and the electric motor/generator 1 generates power using the output torque of the internal combustion engine 6 in the step S31 of the subroutine B. If the determination is affirmative, the controller 12 decreases the engine torque of the internal combustion engine 6 in the step S32. Through this process, the engine torque decreases at a timing t1 as illustrated in FIG. 7E.

If the engine torque continuously decreases, the output torque of the internal combustion engine 6 decreases to the engine stoppable torque at a timing t11 as illustrated in FIG. 7E. In this state, the internal combustion engine 6 and the electric motor/generator 1, which are connected via the first clutch 5, rotate in a synchronous manner.

At this timing, the controller 12 cuts off the fuel supply to the internal combustion engine 6 as illustrated in FIG. 7F in the step S35. It should be noted that, even when the output torque of the internal combustion engine 6 does not decreases to the engine stoppable torque, the controller 12 cuts off the fuel supply to the internal combustion engine 6 in the step S35 as the predetermined time period has elapsed after the process of lowering the output torque of the internal combustion engine 6 starts. As a result, the rotation speed of the internal combustion engine 6 decreases.

At a timing t7, the internal combustion engine 6 and the electric motor/generator 1 become a substantial stationary state. Accordingly, the controller 12 turns off the hybrid drive system.

As described above, this driving control device determines, prior to stop the operation of the internal combustion engine 6 in the vehicle stationary state while the first clutch 5 is engaged, whether or not the first clutch 5 can be disengaged within the predetermined time period. If the first clutch 5 can be disengaged within the predetermined time period, the first clutch 5 is disengaged. If it is difficult to disengage the first clutch 5 within the predetermined time period, the driving torque of the internal combustion engine 6 is decreased to the engine stoppable torque, which is set in advance, by operating the electric motor/generator 1 as a generator while the first clutch 5 is engaged. Thereafter, the operation of the internal combustion engine 6 is stopped.

By disengaging the first clutch 5 and then stopping internal combustion engine 6 when the first clutch 5 can be disengaged within the predetermined time period, the first clutch 5 is disengaged before the decreasing engine rotation speed reaches the resonance frequency band of the power train. Therefore, it is possible to prevent a vibration sound or an abnormal sound generated when the rotation speed of the internal combustion engine 6 passes through the resonance frequency band while the first clutch 5 is engaged.

If it is difficult to disengage the first clutch 5 within the predetermined time period, the driving torque of the internal combustion engine 6 is decreased to the engine stoppable torque, which is set in advance, while the first clutch 5 is engaged. Then, the operation of the internal combustion engine 6 is stopped. As a result, an abrupt rotation speed increase of the internal combustion engine 6 is prevented from occurring. In addition, since the compression reaction force inside the cylinder is lowered by decreasing the engine torque, it is possible to remove a cause of the noise generated when the engine rotation speed passes through the resonance frequency band.

Therefore, using this driving control device, it is possible to prevent a vibration sound or an abnormal sound that may be generated when a driver turns off the ignition button 15 while the internal combustion engine 6 is operated in a vehicle stationary state.

According to this driving control device, the first clutch 5 is reliably disengaged before the rotation speed of the internal combustion engine 6 passes through the resonance frequency band by applying a predetermined time period as a time limitation of the clutch disengagement operation. For this reason, it is possible to reliably prevent a vibration sound or an abnormal sound.

According to this driving control device, it is determined that the first clutch 5 cannot be disengaged within the predetermined time period if there is a failure in the first clutch 5 or the electric oil pump 18 that supplies a hydraulic pressure to the first clutch 5 in the step S3. Therefore, even when such a failure occurs, it is possible to prevent a noise that may be generated by stopping the operation of the internal combustion engine 6 while the internal combustion engine 6 and the electric motor/generator 1 are connected via the first clutch 5.

According to this driving control device, it is also determined that the first clutch 5 cannot be disengaged within the predetermined time period when a temperature of the hydraulic fluid inside the first clutch 5 operated by virtue of a hydraulic pressure is lower than a predetermined temperature in the step S4. Therefore, even when the temperature of the hydraulic fluid is low, it is possible to prevent a noise that may be generated by stopping the operation of the internal combustion engine 6 while the internal combustion engine 6 and the electric motor/generator 1 are connected via the first clutch 5.

In the hybrid electric vehicle 20, the first clutch 5 is a normally engaged clutch that is disengaged by receiving the supply of the hydraulic pressure from the electric oil pump 18 via the hydraulic pressure supply unit 9 and is engaged by releasing the hydraulic pressure. By applying this control device to the hybrid electric vehicle 20 having such a normally engaged first clutch 5, it is possible to decrease the rotation speed of the internal combustion engine 6 to be equal to or lower than the resonance frequency band of the power train before the hydraulic pressure decreases by performing the ignition-off manipulation, and the first clutch 5 is engaged.

The contents of Tokugan 2012-59685, with a filing date of Mar. 16, 2012 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims.

As described above, this invention is advantageous in that it is possible to prevent a vibration sound or an abnormal sound that may be generated when the ignition button is turned off in a hybrid electric vehicle while the internal combustion engine is operated in a vehicle stationary state.

The embodiments of this invention in which an exclusive property or privilege is claimed are defined as follows:

The invention claimed is:

1. A driving control device of a hybrid electric vehicle, the hybrid electric vehicle comprising an internal combustion engine, an electric motor/generator, and a clutch that connects the internal combustion engine and the electric motor/generator, the driving control device comprising:
    a sensor that detects whether or not the clutch is engaged;
    a sensor that detects whether or not the internal combustion engine is in operation;
    a sensor that detects whether or not a request for stopping operation of the internal combustion engine has been input; and
    a programmable controller programmed to
        determine, when the request for stopping operation of the internal combustion engine has been input in a state where the internal combustion engine is in operation and the clutch is engaged in a vehicle stationary state, whether or not the clutch can be disengaged within a predetermined time period;
        if the clutch can be disengaged within the predetermined time period, disengage the clutch and control an operation stop of the internal combustion engine by cutting off a fuel to cause a rotation speed of the internal combustion engine to decrease below a predetermined resonance frequency band while the clutch is disengaged, and
        if the clutch cannot be disengaged within the predetermined time period, decrease an output torque of the internal combustion engine to a predetermined torque in a state where the clutch is engaged and thereafter stop the operation of the internal combustion engine.

2. The driving control device according to claim 1, wherein the predetermined time period is a time period necessary to disengage the clutch.

3. The driving control device according to claim 1, wherein the clutch is a hydraulic clutch that performs engagement and disengagement using a hydraulic pressure, the hybrid electric vehicle comprises a hydraulic pressure supply unit that supplies a hydraulic pressure to the clutch, and the controller is further programmed to:
    determine whether or not the clutch or the hydraulic pressure supply unit has a failure, and
    determine that the clutch cannot be disengaged within the predetermined time period when the clutch or the hydraulic pressure supply unit has a failure.

4. The driving control device according to claim 1, further comprising a sensor that detects a temperature of a hydraulic fluid used to operate the clutch, wherein the controller is further programmed to determine that the clutch cannot be disengaged within the predetermined time period when the temperature of the hydraulic fluid is lower than a predetermined temperature.

5. The driving control device according to claim 3, wherein the controller is further programmed to determine whether or not the electric motor/generator has a failure and determine not to disengage the clutch when the electric motor/generator has a failure.

6. The driving control device according to claim 3, wherein the hybrid electric vehicle has a power train that transmits power of the internal combustion engine and the electric motor/generator to a drive wheel, the predetermined resonance frequency band is a resonance frequency band of the power train, and the controller is further programmed to:
    compare a regenerable torque which is a maximum negative torque that can be applied to the internal combustion engine by the electric motor/generator when the internal combustion engine drives the electric motor/generator as a generator and a lowering limitation torque which is a motor torque necessary to decrease the rotation speed of the internal combustion engine below the predetermined resonance frequency band within the predetermined time period, and
    determine not to disengage the clutch if the lowering limitation torque is equal to or greater than the regenerable torque.

7. The driving control device according to claim 3, wherein the clutch is a normally engaged clutch that is disengaged by a hydraulic pressure supplied from the hydraulic pressure supply unit and engaged by releasing the hydraulic pressure.

8. A driving control method of a hybrid electric vehicle, the hybrid electric vehicle comprising an internal combustion engine, an electric motor/generator, and a clutch connecting the internal combustion engine and the electric motor/generator, the driving control method comprising:
   detecting whether or not the clutch is engaged;
   detecting whether or not the internal combustion engine is in operation;
   detecting whether or not a request for stopping operation of the internal combustion engine has been input; and
   determining, when the request for stopping operation of the internal combustion engine has been input in a state where the internal combustion engine is in operation and the clutch is engaged in a vehicle stationary state, whether or not the clutch can be disengaged within a predetermined time period; wherein
   if the clutch can be disengaged within the predetermined time period, disengaging the clutch and control an operation stop of the internal combustion engine by cutting off a fuel to cause a rotation speed of the internal combustion engine to decrease below a predetermined resonance frequency band while the clutch is disengaged, and
   if the clutch cannot be disengaged within the predetermined time period, decreasing an output torque of the internal combustion engine to a predetermined torque in a state where the clutch is engaged and thereafter stopping the operation of the internal combustion engine.

9. A driving control device of a hybrid electric vehicle, the hybrid electric vehicle comprising an internal combustion engine, an electric motor/generator, and a clutch that connects the internal combustion engine and the electric motor/generator, the driving control device comprising:
   means for detecting whether or not the clutch is engaged;
   means for detecting whether or not the internal combustion engine is in operation;
   means for detecting whether or not a request for stopping operation of the internal combustion engine has been input; and
   control means programmed for
      determining, when the request for stopping operation of the internal combustion engine has been input in a state where the internal combustion engine is in operation and the clutch is engaged in a vehicle stationary state, whether or not the clutch can be disengaged within a predetermined time period;
      disengaging the clutch and controlling an operation stop of the internal combustion engine by cutting off a fuel to cause a rotation speed of the internal combustion engine to decrease below a predetermined resonance frequency band while the clutch is disengaged, if the clutch can be disengaged within the predetermined time period, and
      decreasing an output torque of the internal combustion engine to a predetermined torque in a state where the clutch is engaged and thereafter stopping the operation of the internal combustion engine, if the clutch cannot be disengaged within the predetermined time period.

* * * * *